United States Patent [19]

Mueller et al.

[11] 4,422,268
[45] Dec. 27, 1983

[54] BARREL-VAULT ROOFING ELEMENT

[75] Inventors: Dieter Mueller, Pfungstadt; Inge Löbig, Darmstadt; Klaus Kerk, Griesheim, all of Fed. Rep. of Germany

[73] Assignee: Rohm GmbH, Darmstadt, Fed. Rep. of Germany

[21] Appl. No.: 253,798

[22] Filed: Apr. 13, 1981

[30] Foreign Application Priority Data

Apr. 18, 1980 [DE] Fed. Rep. of Germany ... 8010662[U]

[51] Int. Cl.³ .............................................. E04B 1/32
[52] U.S. Cl. ..................................................... 52/86
[58] Field of Search ................... 52/18, 63, 86, 87, 88, 52/222, 329, 395

[56] References Cited

U.S. PATENT DOCUMENTS

| 1,266,613 | 5/1918 | Moses et al. | 52/395 |
| 2,842,073 | 7/1958 | Huston et al. | 52/395 |
| 3,325,951 | 6/1967 | Johnson | 52/86 |
| 3,483,879 | 12/1969 | Oehmsen | 52/86 |
| 3,531,899 | 10/1970 | Bartlett | 52/86 |

FOREIGN PATENT DOCUMENTS 966624 4/1975 Canada.
2107728 9/1972 Fed. Rep. of Germany.

OTHER PUBLICATIONS

Montageanleitung Tonnengewoelbe ("Mounting Instructions for Roofing Members"), Published by Suckow & Fischer, Biebesheim, West Germany, 1 sheet of Illustrations.

*Primary Examiner*—Peter M. Caun
*Attorney, Agent, or Firm*—Curtis, Morris & Safford

[57] ABSTRACT

A semicylindrical roofing member includes an arch-shaped carrying rib and one cylindrically curved plastic sheet that rests on the carrying rib. At least one non-extensible strap spans the plastic sheet and holds it to the carrying rib. This strap is releasably attached to the carrying rib by catches at its ends. A strip of soft flexible material is positioned between the strap and the plastic sheet on the carrying rib and is compressed by the strap. As a result, the strap is held in position on the sheet under tensile stress and thus secures the sheet to the rib.

4 Claims, 6 Drawing Figures

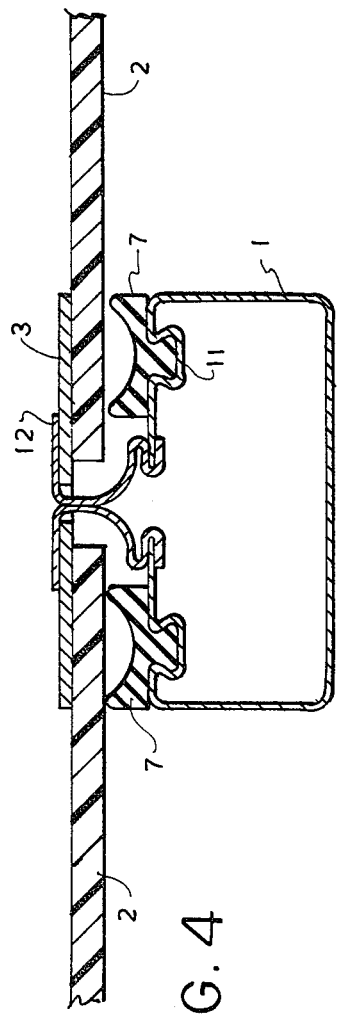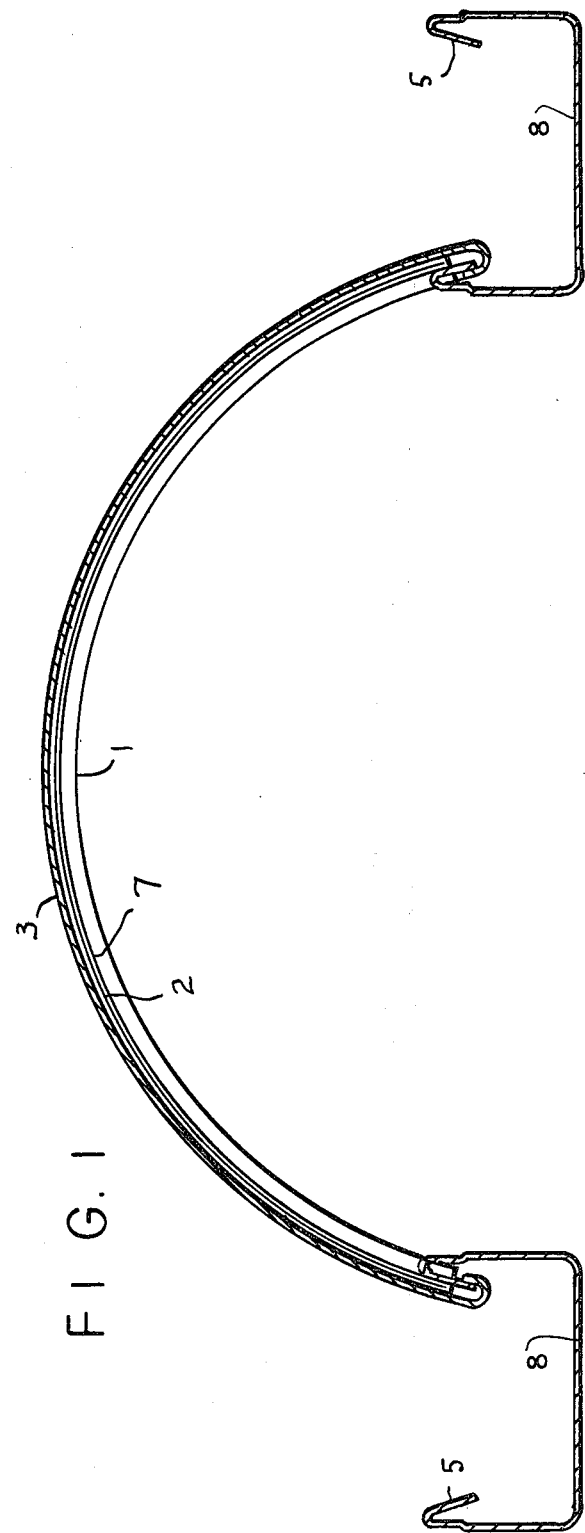

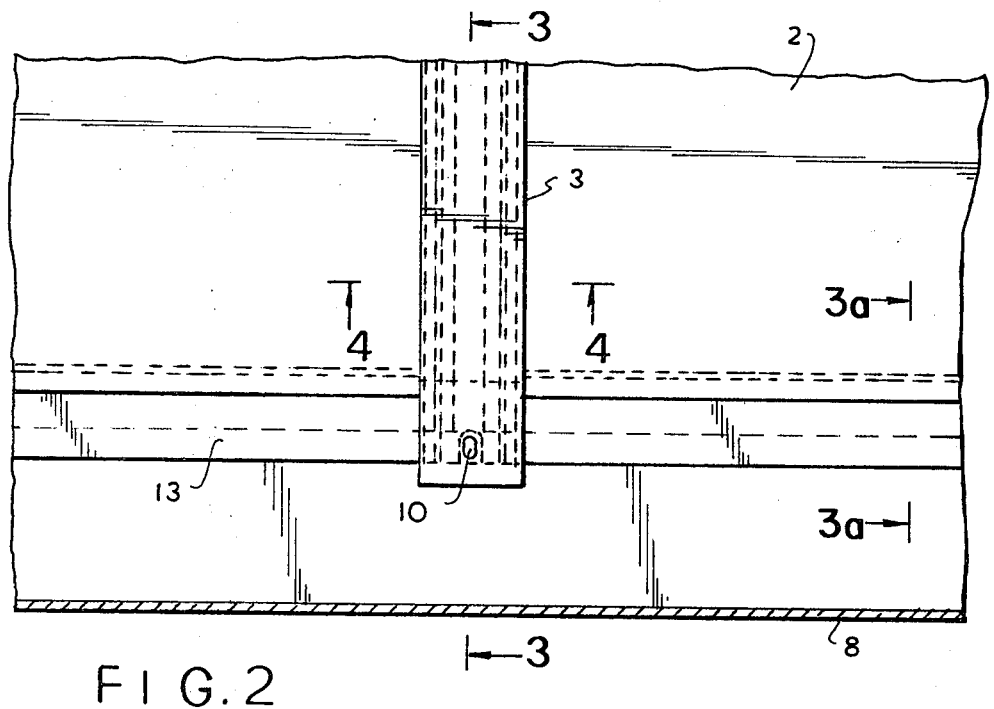
FIG. 2
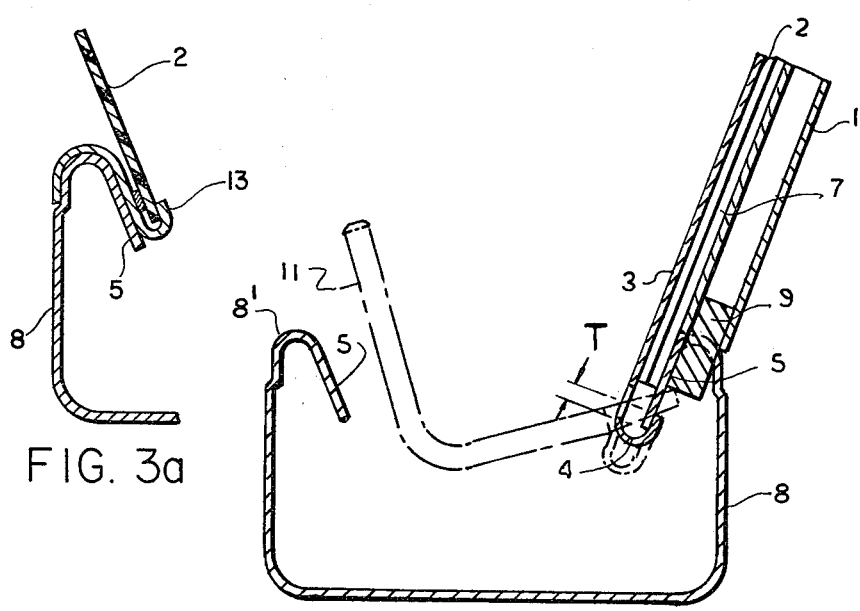
FIG. 3a
FIG. 3

BARREL-VAULT ROOFING ELEMENT

The present invention relates to a roofing member and more particularly to a mounting arrangement for a roofing member having a semicircular cross-section.

Roofing members in the shape of a barrel vault or semi-cylindrical vault (i.e. members which are semicircular in cross-section) have been previously disclosed, for example, in German Patent Disclosure 21 07 728. Such vaults are suitable for the construction of large transparent roof surfaces. However, they have the disadvantage of requiring large numbers of screw joints for assembly.

One common type of semi-cylindrical roofing member has been proposed which uses fewer screw joints for assembly. That type of roofing member consists of at least one curved carrying rib or structural support member and a semi-cylindrical curved plastic sheet that rests on the rib. At least one strap overlies the plastic sheet with its ends attached to opposite ends of the carrying rib. The strap is connected under tension to the rib by catches and thereby overstresses the plastic sheet to hold it on the rib.

At least at one end of the strap in this known structure has a catch that consists of a notched element which cooperates with the rib through a releasable engagement. In this case, the strap is made extensible (or flexible) in its length direction by means of corrugations formed therein. During assembly the strap is stretched longitudinally until the catch at the end of the strap is brought into contact with a corresponding catch on the carrying rib. After the catches are engaged the strap tends to return to its unstretched condition thereby placing the semi-cylindrical sheet under stress.

In the simplest case, the catches at the end of the straps consist of a hook created by bending the strap end, with the hook catching on the end of the rib or on a counter-element supported thereon. After the strap is caught, it remains in a state of stress sufficient to hold the plastic plate to the carrying rib despite the effects of wind.

The corrugations formed in these previously proposed straps are unsatisfactory from an esthetic point of view. In addition, such corrugations can lead to damage of the plastic sheet through resulting punctiform or linear stresses on the plastic sheet where the lower edges of the individual corrugations contact the sheet. Damage of this type can be a source of breakage of the plastic sheet under heavy secondary stress, for example, when there are strong gusts of wind.

Accordingly, it is an object of the present invention to eliminate corrugations in the strap in roofing members that are in the shape of semi-cylindrical vaults without giving up the advantage of easy assembly without screws.

Accordingly to one presently preferred embodiment of the invention, this object is achieved with the aid of a strap that is essentially non-extensible in its longitudinal direction; that is, it has practically no elasticity of shape other than the flexibility characteristic of the material from which the strap is formed. This strap is used in conjunction with a section or strip of soft flexible material positioned between the strap and the plastic sheet and/or between the plastic sheet and the carrying rib. The thickness of this flexible section or strip (or strips if more than one is used) is selected such that the strip can be flexibly compressed by at least one-third of the dimension T by which the end of the strap catch overlies the rib. The dimension T, also referred to hereinafter as the catch depression distance T, refers more specifically to the length of that portion of the catch element on the strap end which overlies the cooperating portion of the carrying rib and which must be moved relative to the rib for the purpose of engaging or disengaging the catch.

The above, and other objects, features and advantages of this invention will be apparent in the following detailed description of an illustrative embodiment thereof, which is to be read in connection with the accompanying drawings wherein:

FIG. 1 is a cross-sectional view of a semi-cylindrical roof member of the present invention;

FIG. 2 is a side view on a larger scale of the base of the span of a roofing member at the point of contact between two roofing members;

Figure 2A is a view similar to Figure 2, but showing on the right side thereof a sectional view with the arrows associating the lines of the plan view with the components shown in section;

FIG. 3 is a cross-sectional view taken along line 3—3 of FIG. 2, showing the strap in various positions in dotted lines during the assembly procedure;

FIG. 3a is a cross-sectional view taken along line 3a—3a of FIG. 2, showing the edge mounting of the plastic sheets; and FIG. 4 is a longitudinal sectional view taken along line 4—4 of FIG. 2 of the locking of the strap and carrying rib.

Referring now to the drawing in detail, and initially to FIG. 1, it is seen that the roofing structure R of the invention includes a semi-cylindrical roofing member 2. This roofing member is formed of a plastic sheet which preferably consists of a material that is supplied flat and is flexibly bowed over a carrying rib or arched support member 1 during the assembly operation. Accordingly, the sheet must have a flexibility adapted to the intended curvature of the support rib. It has been found that a plate material sold under the trademark "ACRYLGLAS", particularly biaxially worked "ACRYLGLAS" having a thickness of 1 to 5 mm, is very suitable for vault spans, particularly in widths of from 1 to 3 meters.

Plastic composite web plates can also be used to form sheets 2, but because of their considerably higher resistance to bending they can be used only for relatively flat vault curves. Other suitable materials, in addition to "ACRYLGLAS", are rigid polyvinylchloride and particularly polycarbonate. The latter, because of its high degree of toughness, is particularly suitable for relatively highly curved vault spans made of composite web plates.

As a rule, completely transparent, colorless material is used for sheets 2. However, dark-tinted, light-dispersing, or superficially textured material can also be used, if desired.

The carrying ribs or support arches 1 determine the curvature of the vault arch. These ribs are typically manufactured in the desired curved form and then attached in any convenient manner to a support structure for the roof. These ribs are made, for example, of sheet steel or extruded light-metal sections. They are attached to a sub-support structure which may consist of channels 8. The connection with the channels can be made in any convenient manner, for example, by means of pins 9, secured by welding or the like in the ends of the ribs, and received in openings formed in the flanges 8' ends of the channels 8.

Sheets 2 are held on ribs 1 by use of the straps 3. The straps are relatively rigid, i.e. non-extensible in their longitudinal direction, but they are flexible in a transverse direction to conform to the arch of ribs 1. As described hereinafter, straps 3 are releasably connected to ribs 1 by catches 4.

A strip of soft flexible material 7 is positioned between a flange 11 of rib 1 and sheet 2 beneath strap 3. This strip is compressed as a result of the forces applied to sheet 2 by strap 3.

When strap 3 is pulled with sufficient force against sheet 2, in the direction of the strap's length, the catch on the end of the strap will be pulled out of its lock-in or latched position with the rib. That is, the catch 4 (as a result of the compression of strip 7) will move from the solid line position in FIG. 3 to the dotted line position through the catch depression distance T to be engaged or disengaged with the rib catch 5. The flatter the bow of the carrying rib 1, the greater will be the compression of the strip 7 required to release the catch.

For example, if the bow of the carrying rib is semicircular, it is sufficient if the flexible strip 7 is compressed by approximately one-third of the catch depression distance T. If, on the other hand, the bow of the semicircular vault is flatter, then strip 7 must be formed in such manner that it can be flexibly compressed by approximately double the catch depression distance T.

The preferred curvature for the semicircular vault is between a semicircle and a quarter-circle; in these cases, a flexible compressibility of strip 7 by one-third to two-thirds of the catch depression distance T is sufficient to disengage the catch.

The length of strap 3 and the position of the catches 4 and 5 are determined in such a manner that strip 7 is still slightly distorted after engagement of the catches. A more stable mounting of plastic sheet 2 on the rib is thereby assured.

Strip 7 is preferably formed as a continuous section made of soft flexible material such as, for example rubber, as either a sponge rubber element rectangular in cross-section or as a solid rubber element having flexible lips as shown in FIG. 4. This strip may be placed on the upper side of the carrying rib 1 as shown in FIG. 1 or on the bottom of strap 3 between the strap and sheet 2. A pair of flexible strips may also be used in both these areas.

Since for safety reasons the catch depression distance T is at least 5 mm, and preferably 10 to 20 mm, depending on the curvature of the carrying rib 1, strip 7 must be compressible by from one-third to double this amount. The flexibility of the material is as a general rule not sufficient for this purpose. Thus, strip 7 preferably has a suitable cross section shape which guarantees the necessary compressibility through flexibility of its shape. The total thickness of strip 7 is advantageously about double the amount by which it is compressed when strap 3 is engaged.

If a flexible strip 7 is positioned on both the upper side of carrying rib 1 and on the bottom of strap 3, it is sufficient if the two strips can be compressed jointly by the necessary amount when strap 3 is engaged. For reasons of expense, use of only one strip 7, preferably on carrying rib 1, is preferred. It is the compression of strip 7, when the ends of strap 3 are connected to rib 1, which tensions or stresses strap 3. The tension of the strap in turn holds sheet 2 on rib 1.

The catches 4 and 5 of strap 3 and rib 1 can be formed in any convenient manner or construction which will provide releasable engagement with a catch depression distance T that enables engagement and release by movement of the strap catch in the direction of the length of the strap while also providing a stable stop in each direction under tensile stress created in the strap and acting in the direction of its length. Preferably, the end of strap 3 is bent into a hook-shaped catch 4 so that it can catch directly on the bottom end of the carrying rib 1. However, as shown in FIG. 3, catch or hook 4 can also cooperate with and hook onto a catch or tab 5 that is formed as an integral part of the sub-structure, e.g. a part of channel 8. Alternatively the catch or tab 5 may be formed as an integral part of the rib 1 (not shown). In any case, it is essential that the tensile stress in strap 3 be transferred from the strap through catches 4 and 5 to carrying rib 1.

Strap 3 preferably consists of a flat sheet-steel strip. To make assembly easier the strap may have a hole 10 formed therein for receiving a tightening key 11. This key, shown in dotted lines in FIG. 3, can be used as a lever to pull strap 3 and its catch 4 down around the catch 5 of rib 1. It is sufficient if strap 3 is equipped at one end with a catch connection of the type described, while the other end is attached in any other desired manner, for example, by rivets or welding, to rib 1 or to a part supported thereon. Preferably, however, both ends of strap 3 have catches 4 thereon engaged with rib 1 in the same manner.

In constructing a large roofing surface with a large number of roofing members according to the invention, carrying rib 1 is advantageously located between every two plastic sheets 2, so that in each case opposed edges of two plastic sheets 2 rest on the carrying rib. A locking mechanism or clip 12 is attached between the edges of the plastic sheets in this case to prevent side slippage of strap 3. A plurality of these locking clips are positioned to extend through corresponding drill holes in the carrying rib and strap with flanges bent back on both sides over the strap and edges of the rib as shown in FIG. 4.

For greater rigidity of the arch, the rectilinear edge of plastic sheet 2, at the base or longitudinal edge thereof, has a U-shaped section bar 13 (FIGS. 2 and 3A) mounted thereon and attached in any convenient manner to sub-structure 8.

Large roofing areas—even for temporary use, if necessary—can be mounted and disassembled in a short time with the roofing members according to the present invention. Assembly is limited to a few maneuvers. More specifically, the U-bars 13 and carrying rib 1 are first positioned on sub-structure 8, and then plastic sheets 2 are laid down and inserted on both sides in the section U-bars. Thereafter, straps 3 are positioned on the joints between the plastic plates and their catches are engaged on both sides to the ends of rib 1.

Although an illustrative embodiment of the invention has been described herein with reference to the accompanying drawings it is to be understood that the invention is not limited to that precise embodiment, and that various other changes and modifications may be effected therein by one skilled in the art without departing from the scope or spirit of this invention.

What is claimed is:

1. A roofing member comprising at least one arch-shaped carrying rib, a cylindrically curved plastic sheet resting on the carrying rib; at least one nonextensible strap spanning said plastic sheet and having opposed ends, at least one of which is releasably secured to said rib, said at least one end of the strap having a releasable catch thereon slidably engaged with a catch connected to said rib, said catches overlapping by a dimension T in the direction of strap length; and at least one strip of soft flexible material positioned between the plastic sheet and either said strap or said carrying rib, the thickness of said strip being selected such that the strip is compressed by at least one third of the dimension T when said catches are engaged and the ends of the strap are attached to the rib thereby to tension the strap and hold the plastic sheet on the rib.

2. A roofing member as defined in claim 1, wherein said plastic sheet has an arcuate edge supported on said carrying rib, and at least one locking clip means is engaged between said carrying rib and said strap for preventing side slippage of said strap.

3. A roofing member as defined in claim 2, wherein said sheet has a pair of rectilinear edges extending perpendicular to said rib; and two bars having a U-shaped cross-section secured to and receiving said rectilinear edges of the plastic sheet.

4. A roofing member as defined in claim 3, including a support channel for said rib and wherein said catch fixed to said rib is secured to said support channel.

* * * * *